(12) United States Patent
Liu et al.

(10) Patent No.: US 8,143,800 B2
(45) Date of Patent: Mar. 27, 2012

(54) CIRCUITS AND METHODS FOR DRIVING A LOAD WITH POWER FACTOR CORRECTION FUNCTION

(75) Inventors: Da Liu, Milpitas, CA (US);
Ching-Chuan Kuo, Taipei (TW);
Sheng-Tai Lee, Taipei (TW)

(73) Assignee: O2Micro, Inc., Santa Clara, CA (US)

( * ) Notice: Subject to any disclaimer, the term of this patent is extended or adjusted under 35 U.S.C. 154(b) by 64 days.

(21) Appl. No.: 12/817,388

(22) Filed: Jun. 17, 2010

(65) Prior Publication Data
US 2010/0320934 A1    Dec. 23, 2010

Related U.S. Application Data (60) Provisional application No. 61/219,087, filed on Jun. 22, 2009.

(51) Int. Cl.
*H05B 37/02* (2006.01)
(52) U.S. Cl. ........ 315/247; 315/219; 315/224; 315/307; 315/308
(58) Field of Classification Search .................. 315/224, 315/219, 209 R, 223, 225, 220, 246, 247, 315/307, 308, 185 R, 193, 192
See application file for complete search history.

(56) References Cited

U.S. PATENT DOCUMENTS

| | | | |
|---|---|---|---|
| 7,714,516 B2 * | 5/2010 | Ito et al. | 315/291 |
| 7,852,014 B2 | 12/2010 | Scollo et al. | |
| 7,855,520 B2 * | 12/2010 | Leng | 315/307 |
| 8,044,600 B2 * | 10/2011 | Yan et al. | 315/219 |
| 2009/0009099 A1 | 1/2009 | Cho et al. | |

FOREIGN PATENT DOCUMENTS

| | | |
|---|---|---|
| CN | 1767304 A | 5/2006 |
| CN | 1961267 A | 5/2007 |
| CN | 101399494 A | 4/2009 |

OTHER PUBLICATIONS

English Translation for Abstract of Chinese Patent Publication No. 1767304, May 3, 2006.
English Translation for Abstract of Chinese Patent Publication No. 101399494, Apr. 1, 2009.

* cited by examiner

*Primary Examiner* — David Hung Vu (57) ABSTRACT

A circuit for driving a load includes a power line, converter circuitry, and a controller. The power line is operable for providing an input current and an input voltage. The converter circuitry coupled to the power line is operable for converting the input voltage to a regulated voltage to drive the load, and for providing a current detection signal indicating whether a converter current flowing through the converter circuitry drops to a predetermined level. The controller coupled to the converter circuitry is operable for correcting a power factor of the circuit based on the current detection signal and the input voltage such that a waveform of the input current follows a waveform of the input voltage.

15 Claims, 7 Drawing Sheets

CIRCUITS AND METHODS FOR DRIVING A LOAD WITH POWER FACTOR CORRECTION FUNCTION

RELATED APPLICATION

This application claims priority to U.S. Provisional Application No. 61/219,087, titled "Circuits and Methods for Generating Alternating Current (AC) Power," filed on Jun. 22, 2009, which is hereby incorporated by reference in its entirety.

BACKGROUND

Currently, light sources such as light emitting diodes (LEDs) are widely used in the lighting industry, e.g., for backlighting liquid crystal displays (LCDs), street lighting, and home appliances. Direct current (DC) light sources are driven by DC power, e.g., supplied by a battery pack. Additional circuits such as transformers and converters are used to convert an alternating current (AC) electrical power to a suitable DC electrical power if an AC power source is served as the power supply.

Some light sources are driven by an AC electrical power, e.g., a light source including LED strings coupled in parallel and wired in opposite polarity connections. However, voltage variations of the AC electrical power, e.g., an AC power with a sinusoidal voltage wave, can reduce the stability of a current through the AC light source. In addition, circuits such as transformers and converters can be employed to drive the AC light sources. However, non-linear elements and energy storage elements (e.g., capacitors and inductors) contained in the transformers and converters can store energy and distort an input current of such circuits. Thus, a power factor indicative of the power efficiency may be degraded.

SUMMARY

In one embodiment, a circuit for driving a load includes a power line, converter circuitry, and a controller. The power line is operable for providing an input current and an input voltage. The converter circuitry coupled to the power line is operable for converting the input voltage to a regulated voltage to drive the load, and for providing a current detection signal indicating whether a converter current flowing through the converter circuitry drops to a predetermined level. The controller coupled to the converter circuitry is operable for correcting a power factor of the circuit based on the current detection signal and the input voltage such that a waveform of the input current follows a waveform of the input voltage.

BRIEF DESCRIPTION OF THE DRAWINGS

Features and advantages of embodiments of the subject matter will become apparent as the following detailed description proceeds, and upon reference to the drawings, wherein like numerals depict like parts, and in which.

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments in accordance with the present disclosure provide a circuit for driving a load, e.g., AC light emitting diodes (LEDs). The invention is described in relation to AC LEDs by way of example. However, the invention is not limited to power AC LEDs and can be used to power various light sources and loads.

In one embodiment, the circuit includes a power line, converter circuitry, and a controller. The power line is operable for providing an input voltage and an input current. The converter circuitry converts the input voltage to a regulated voltage to drive a load, e.g., the AC LEDs. The converter circuitry further generates a current detection signal indicating whether a converter current flowing through the converter circuitry drops to a predetermined level such as zero ampere. Advantageously, the controller can correct a power factor of the circuit based on the input voltage and the current detection signal to achieve a waveform of the input current following a waveform of the input voltage. As such, the power efficiency of the circuit is improved.

Figure 1:
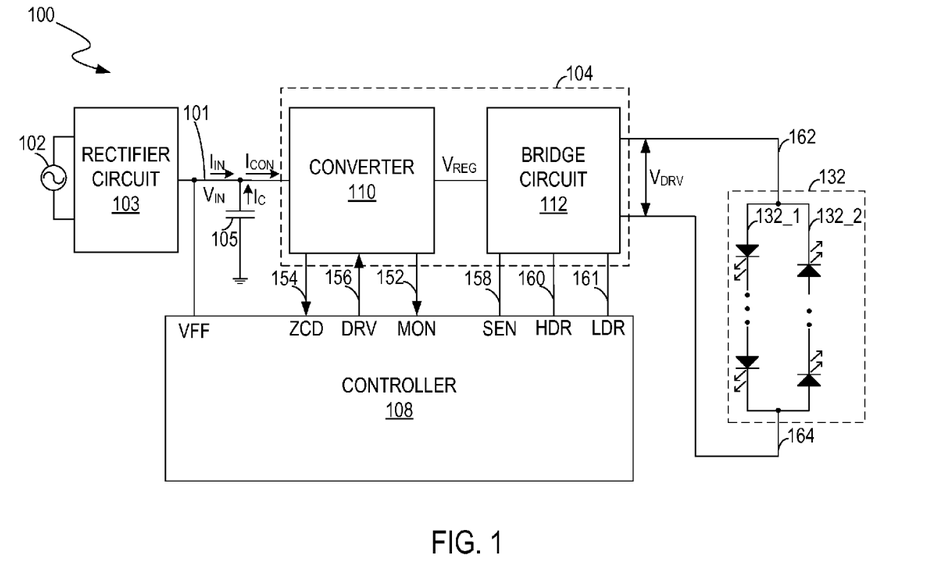
FIG. 1 illustrates a block diagram of a circuit for driving a load, in accordance with one embodiment of the present invention.

FIG. 1 illustrates a block diagram of a circuit 100 for driving a load, in accordance with one embodiment of the present invention. In the example of FIG. 1, the circuit 100 includes an alternating current (AC) power source 102, a rectifier circuit 103, a filter 105, converter circuitry 104, a load such as an AC light source 132, and a controller 108. The AC power source 102 generates an input AC voltage, e.g., 120V, having a sinusoidal voltage waveform. The rectifier circuit 103 rectifies the input AC voltage to a rectified AC voltage at a power line 101 coupled to the output of the rectifier circuit 103. Thus, the power line 101 provides an input voltage $V_{IN}$ and an input current $I_{IN}$. The converter circuitry 104 includes a converter 110 for converting the input voltage $V_{IN}$ to a regulated voltage $V_{REG}$ having less voltage variation than the input voltage $V_{IN}$. The converter circuitry 104 further includes a bridge circuit 112 for using the regulated voltage $V_{REG}$ to drive the AC light source 132. In one embodiment, the controller 108 can be integrated on an integrated circuit (IC) chip and is coupled to the converter circuitry 104 via multiple pins such as an HDR pin, an LDR pin, an SEN pin, a VFF pin, a ZCD pin, a DRV pin, and a MON pin. The controller 108 is used to control the converter circuitry 104.

The AC light source 132 can include multiple light emitting diode (LED) strings such as LED strings 132_1 and 132_2. Each LED string can include multiple series-connected LEDs. Although two light source strings are shown in the example of FIG. 1, the invention is not so limited and other number of light source strings can be included in the light source 132. The LED strings 132_1 and 132_2 can be wired in opposite polarity connections and coupled in parallel between a pair of output terminals of the converter circuitry 104. Thus, the LED strings 132_1 and 132_2 require an AC power to properly operate. The light source 132 can have other configurations and is not limited to the example in FIG. 1.

The bridge circuit 112 is operable for using the regulated voltage $V_{REG}$ to drive the AC light source 132. In one embodiment, the controller 108 can generate multiple switch control signals 160 and 161 at the HDR pin and the LDR pin, respectively. The bridge circuit 112 coupled to the HDR pin and the LDR pin transforms the regulated voltage $V_{REG}$ to a regulated AC voltage $V_{DRV}$ according to the switch control signals 160 and 161 to power the AC light source 132, which will be further described in relation to FIG. 2. Advantageously, instead of being directly driven by the input AC voltage, e.g., an AC voltage having a sinusoidal voltage waveform, the AC light source 132 is driven by the regulated AC voltage $V_{DRV}$ transformed from the regulated voltage $V_{REG}$. The regulated AC voltage $V_{DRV}$ has less voltage variation than the input AC voltage. Therefore, the current stability of the AC light source 132 can be improved.

The rectifier circuit 103 can include, but is not limited to, a half-wave rectifier, a full-wave rectifier, or a bridge rectifier. The rectifier circuit 103 is operable for commutating the input AC voltage from the AC power source 102 to provide the rectified AC voltage. More specifically, the rectifier circuit 103 can exclude negative waves/portions of the input AC voltage, or convert the negative waves/portions to corresponding positive waves, in one embodiment. Therefore, the input voltage $V_{IN}$ having positive voltage waves/portions can be obtained at the power line 101. In another embodiment, the input voltage $V_{IN}$ may be provided by a DC power source, e.g., a battery pack.

The converter 110 can be, but is not limited to, a switch-mode converter such as a buck converter, a boost converter, a buck-boost converter, or a flyback converter. The converter 110 coupled to the power line 101 is operable for converting the input voltage $V_{IN}$ to the regulated voltage $V_{REG}$. Moreover, a converter current $I_{CON}$ can flow through the converter 110. In one embodiment, the converter current $I_{CON}$ ramps up during an ON time when a current path of the converter current $I_{CON}$ is enabled and drops to a predetermined level I1 such as substantially zero ampere during an OFF time when the current path is disabled. The converter 110 can further generate a current monitoring signal 152 indicating the converter current $I_{CON}$ and a zero current detection (ZCD) signal 154 indicating whether the converter current $I_{CON}$ drops to the predetermined level I1. The current monitoring signal 152 and the zero current detection signal 154 are received by the controller 108 via the pin MON and the pin ZCD, respectively.

The filter 105 is operable for filtering or attenuating high frequency components of the converter current $I_{CON}$ to obtain the input current $I_{IN}$. In one embodiment, the filter 105 can include a capacitor coupled to ground. The capacitor of the filter 105 and the equivalent resistance of the rectifier circuit 103 can operate as a resistor-capacitor (R-C) low-pass filter. The converter current $I_{CON}$ ramps up when a current path of the converter 110 is enabled and ramps down when the current path is disabled. Since the filter 105 can filter high frequency components of the converter current $I_{CON}$, the input current $I_{IN}$ can be a continuous current that is equivalent to an average current of the converter current $I_{CON}$. The filter 105 can include other components, and is not limited to the example of FIG. 1.

Furthermore, the controller 108 receives the input voltage $V_{IN}$ via the VFF pin, and generates a control signal 156 at the DRV pin based on the zero current detection signal 154 and the input voltage $V_{IN}$. Advantageously, the converter 110 can receive the control signal 156 via the DRV pin and can adjust the current $I_{CON}$ accordingly to keep an average current of the current $I_{CON}$, e.g., the input current $I_{IN}$, to be in phase with the input voltage $V_{IN}$, which are described in relation to FIG. 2, FIG. 3 and FIG. 6. That is, the controller 108 can correct a power factor of the circuit 100 according to the zero current detection signal 154 and the input voltage $V_{IN}$ to achieve a waveform of the input current $I_{IN}$ following a waveform of the input voltage $V_{IN}$. As such, the power efficiency of the circuit 100 is improved.

In one embodiment, the bridge circuit 112 can generate a current sense signal 158 indicating a load current flowing through the AC light source 132. The controller 108 receives the current sense signal 158 via the SEN pin. Advantageously, the controller 108 can adjust the control signal 156 based on the current sense signal 158 to regulate the regulated voltage $V_{REG}$, such that the load current through the AC light source 132 can be regulated and the current stability of the AC light source 132 can be improved. The operation of the controller 108 to regulate the load current will be further described in relation to FIG. 2 and FIG. 5.

Figure 2:
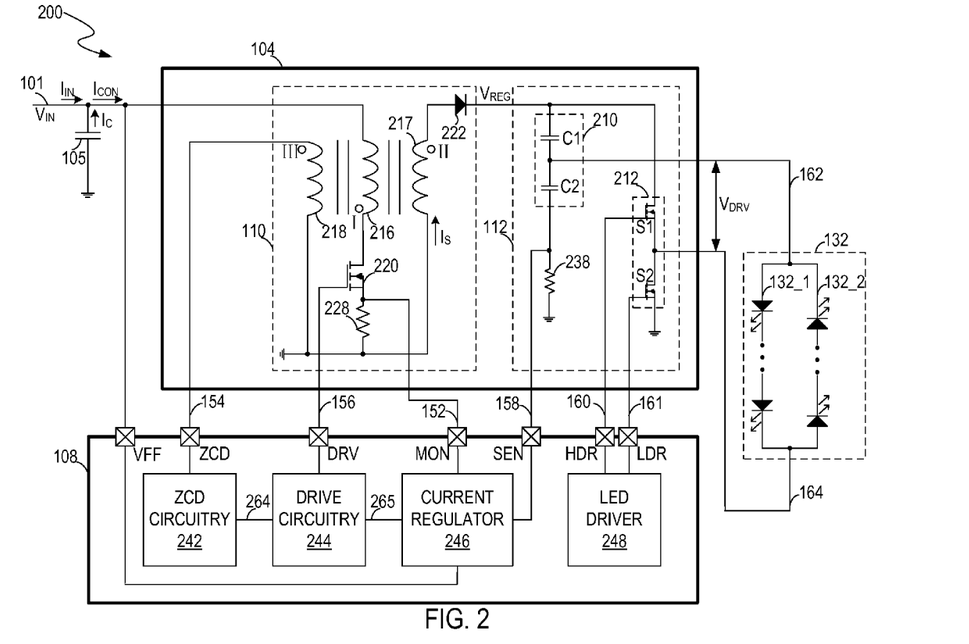
FIG. 2 illustrates a circuit for driving a load, in accordance with one embodiment of the present invention.

FIG. 2 illustrates a circuit 200 for driving a load, e.g., the AC light source 132, in accordance with one embodiment of the present invention. Elements labeled the same as in FIG. 1 have similar functions. FIG. 2 is described in combination with FIG. 1.

In the example of FIG. 2, the converter 110 can be a flyback converter including a switch 220, a diode 222, a current sensor 228, and a transformer T1. The transformer T1 includes a primary winding 216, a secondary winding 217, and an auxiliary winding 218. The bridge circuit 112 can include a switching circuit 212, a voltage divider 210, and a current sensor 238. In one embodiment, the switching circuit 210 includes a pair of series-connected switches S1 and S2. The voltage divider 210 includes multiple series-connected capacitors such as capacitors C1 and C2. The flyback converter 110 and the bridge circuit 112 can have other configurations, and is not limited to the example of FIG. 2.

The flyback converter 110 can operate in a switch mode. The primary winding 216 coupled to the rectifier circuit 103 receives the input voltage $V_{IN}$. The current $I_{CON}$ flows through the primary winding 216. The switch 220 coupled to the primary winding 216 is used to enable or disable a current path of the current $I_{CON}$. The secondary winding 217 magnetically coupled to the primary winding 216 provides the regulated voltage $V_{REG}$ according to the current $I_{CON}$. Another converter current $I_S$ flowing through the secondary winding 217 can be generated according to the current $I_{CON}$.

More specifically, in one embodiment, when the switch 220 is turned on, the current $I_{CON}$ flowing through the primary winding 216 can ramp up, and energy from the power line 101 is stored in the core of the transformer T1. Meanwhile, the diode 222 coupled to the secondary winding 217 is reverse-biased. The energy delivered to the AC light source 132 is provided by the series-connected capacitors C1 and C2. During the time interval when the switch 220 is turned on, the current $I_{CON}$ flowing through the primary winding 216 can ramp up according to:

$$di/dt = V_{IN}/L = \Delta I / T_{ON}, \quad (1)$$

where di/dt represents a change rate of the current $I_{CON}$, L represents the inductance of the primary winding 216, $T_{ON}$ represents a time interval duration when the switch 220 is turned on, and $\Delta I$ represents a change of the current $I_{CON}$ during $T_{ON}$.

When the switch 220 is turned off, the current $I_{CON}$ can drop to the predetermined level I1 such as zero ampere. The variation of the current $I_{CON}$ causes the secondary winding 217 to generate a positive voltage at a polarity end II of the secondary winding 217, in one embodiment. Thus, the diode 222 becomes forward-biased. The converter current $I_S$ flows through the secondary winding 217 to transfer the energy stored in the core of the transformer T1 to the bridge circuit 112. The current $I_S$ gradually decreases to substantially zero.

As such, the flyback converter 110 converts the input voltage $V_{IN}$ to the regulated voltage $V_{REG}$. The level of the regulated voltage $V_{REG}$ is proportional to the ratio of the time $T_{ON}$ during which the switch 220 is turned on to the time $T_{OFF}$ during which the switch 220 is turned off. Therefore, the voltage variation of the regulated voltage $V_{REG}$ is less than that of the input voltage $V_{IN}$ and the input AC voltage.

In one embodiment, the current sensor 228 can be a resistor coupled to the primary winding 216. The current sensor 228 senses the current $I_{CON}$ flowing through the primary winding 216 and provides a current monitoring signal 152 indicative of the current $I_{CON}$. For example, the current monitoring signal 152 is represented by a voltage across the resistor 228 and is received by the controller 108 via the sense pin MON.

In one embodiment, the auxiliary winding 218 is operable for generating the zero current detection signal 154 indicating whether the current $I_{CON}$ drops to a predetermined level I1 such as zero ampere. During the OFF time when the switch 220 is turned off, the current $I_{CON}$ flowing through the primary winding 216 can drop to the predetermined level I1 such as zero ampere. Accordingly, the current $I_S$ through the secondary winding 217 ramps down from $I_{SPK}$. The auxiliary winding 218 senses the current variation of the current $I_{CON}$ and the current $I_S$ and generates a positive voltage at a polarity end III of the auxiliary winding 218, in one embodiment. When the current $I_S$ drops to substantially zero, the voltage across the auxiliary winding 218 also drops to substantially zero. Therefore, a falling edge of the zero current detection signal 154 is generated when the current $I_S$ drops to zero ampere. As a result, the falling edge of the zero current signal 154 indicates that the converter current $I_{CON}$ has dropped to the predetermined level I1, in one embodiment.

The bridge circuit 112 transforms the regulated voltage $V_{REG}$ to the regulated AC voltage $V_{DRV}$ to drive the light source 132. In one embodiment, the voltage divider 210 coupled to a terminal 162 of the AC light source 132 divides the regulated voltage $V_{REG}$ to a divided voltage $V_{DIV}$ at the terminal 162. In one embodiment, the voltage $V_{DIV}$ at the terminal 162 is less than the regulated voltage $V_{REG}$.

The controller 108 generates the switch control signals 160 and 161 at the pin HDR and the pin LDR, respectively, for controlling the switching circuit 212. The switch control signals 160 and 161 can be, but are not limited to, pulse frequency modulation (PFM) signals or pulse width modulation (PWM) signals.

The switching circuit 212 receives the switch control signals 160 and 161 via the pin HDR and the pin LDR. In one embodiment, the switch control signals 160 and 161 alternately enable the switches S1 and S2. For example, the switch control signals 160 and 161 can be digital zero and digital one, respectively, to turn off the switch S1 and turn on the switch S2. Thus, a substantially constant voltage which is less than the divided voltage $V_{DIV}$ at terminal 162, e.g., the voltage at ground, is applied to the terminal 164. At this moment, the AC regulated voltage $V_{DRV}$ can be represented by equation (2):

$$V_{DRV} = V_{DIV}. \quad (2)$$

As such, a load current $I_{LED1}$ flows through the capacitor C1, LED string 132_1, the switch S2, and ground, thereby enabling the LED string 132_1 and disabling the LED string 132_2.

Alternatively, the switch control signals 160 and 161 can be digital one and digital zero, respectively, to turn on the switch S1 and turn off the switch S2. Then, the regulated voltage $V_{REG}$ which is greater than the divided voltage $V_{DIV}$ at terminal 162 is applied to the terminal 164 of the AC light source 132. At this moment, the AC regulated voltage $V_{DRV}$ can be represented by equation (3).

$$V_{DRV} = V_{DIV} - V_{REG}. \quad (3)$$

As such, a load current $I_{LED2}$ flows through the switch S1, the LED string 132_2, the capacitor C2, and the sensor 238, thereby enabling the LED string 132_2 and disabling the LED string 132_1.

In conclusion, the switching circuit 212 can alternately apply the regulated voltage $V_{REG}$ and a constant voltage (e.g., the voltage at ground) to the terminal 164 of the AC light source 132. As a result, the regulated AC voltage $V_{DRV}$ is obtained between the terminal 162 and the terminal 164 for driving the AC light source 132.

In one embodiment, the current sensor 238 can be a resistor coupled between the capacitor C2 and ground, such that the load current $I_{LED2}$ flowing through the LED string 132_2 is sensed when the switch S2 is turned off and the switch S1 is turned on. In an alternative embodiment, the resistor 238 can be coupled between the switch S2 and ground, and is operable for sensing the load current $I_{LED1}$ that flows through the LED string 132_1 when the switch S2 is turned on and the switch S1 is turned off. Moreover, the sensor 238 can further generate a current sense signal 158 indicating the load current $I_{LED1}$ or $I_{LED2}$ flowing through the light source 132.

In one embodiment, the controller 108 includes an LED driver 248 for generating the switch control signals 160 and 161, e.g., pulse width modulation signals, at the pins HDR and LDR, respectively. In one embodiment, the switch control signals 160 and 161 are complementary, and duty cycles of the switch control signals 160 and 161 are set to approximately 50% such that the LED string 132_1 and the LED string 132_2 can produce uniform brightness.

The frequency of the switch control signals 160 and 161 can be set according to the series-connected capacitors C1 and C2. For example, if the total capacitance of the capacitors C1 and C2 is reduced, the capacitors C1 and C2 may store less energy. Accordingly, the frequency of the switch control signals 160 and 161 can be increased to shorten charging and discharging time periods of the capacitors C1 and C2. As such, the stability of the regulated voltage $V_{REG}$ and the load currents flowing through the LED strings would not be affected by the capacitance variations of the capacitors C1 and C2.

The brightness of the LED strings is controlled by adjusting the switch control signals 160 and 161. For example, to decrease the brightness of the LED strings, the switch control signals 160 and 161 can be both adjusted to digital zero for a predetermined time period $T_{DIM}$, which may turn off the switches S1 and S2 simultaneously. After the time period $T_{DIM}$ expires, the switch control signals 160 and 161 can recover to pulse width modulation signals. Since the total time period for light emitting is shortened, the total brightness of the LED strings is reduced.

The controller 108 is capable of correcting a power factor of the circuit 200 and regulating the load current $I_{LED1}$ and $I_{LED2}$ flowing through the AC light source 132. In one embodiment, the controller 108 includes zero current detection (ZCD) circuitry 242, drive circuitry 244, and a current regulator 246. The drive circuitry 244 is operable for generating a control signal 156 at the pin DRV to control the switch 220. In one embodiment, the control signal 156 can be a pulse width modulation (PWM) signal. As the regulated voltage $V_{REG}$ is determined by the ratio of the ON time during which the switch 220 is turned on to the OFF time during which the switch 220 is turned off, the regulated voltage $V_{REG}$ can be controlled by adjusting the duty cycle of the control signal 156.

The ZCD circuitry 242 is used to determine the OFF time during which the switch 220 is turned off. The ZCD circuitry 242 receives the zero current detection signal 154 indicating whether the current $I_{CON}$ drops to the predetermined level I1 and generates a switch-trigger signal 264 accordingly. For example, the switch-trigger signal 264 is generated when a falling edge of the zero current detection signal 154 is detected, which indicates the current $I_{CON}$ drops to the predetermined level I1. The drive circuitry 244 coupled to the ZCD circuitry 242 receives the switch-trigger signal 264 and turns on the switch 220 through the control signal 152 accordingly. Advantageously, the current path of the current $I_{CON}$ can be enabled after the current $I_{CON}$ reaches the predetermined level I1. Thus, the current $I_{CON}$ through the primary winding 216 can ramp up from the predetermined level I1, e.g., zero ampere, each time when the current path is enabled.

The current regulator 246 is used to determine the ON time during which the switch 220 is turned on. As described in relation to FIG. 1, the controller 108 includes the input voltage pin VFF for receiving the input voltage $V_{IN}$, the sense pin SEN for receiving the current sense signal 158 indicating the load current flowing through the AC light source 132, and the sense pin MON for receiving the current monitoring signal 152 indicating the current $I_{CON}$ through the primary winding 216. The current regulator 246 can provide a voltage threshold VTH based on the sense signal 158 and the voltage $V_{IN}$. In one embodiment, the voltage threshold VTH is proportional to the voltage $V_{IN}$, where the proportional coefficient is determined by the sense signal 158 indicative of the load current flowing through the AC light source 132.

The current regulator 246 compares the current monitoring signal 152 to the voltage threshold VTH and generates a switch-termination signal 265 based on a result of the comparison. The drive circuitry 244 receives the switch-termination signal 265 and turns off the switch 220. Thus, the threshold VTH represents a peak level of the current $I_{CON}$.

Advantageously, the current $I_{CON}$ ramps up from the predetermined level I1 and the peak level of the current $I_{CON}$ is proportional to the input voltage $V_{IN}$. Thus, an average current of the current $I_{CON}$ is approximately in phase with the input voltage $V_{IN}$. In other words, the input current $I_{IN}$ indicating the average current of the current $I_{CON}$ has a waveform following the waveform of the input voltage $V_{IN}$, which improves the power factor of the circuit 200. The operation of the current $I_{CON}$ and the input current $I_{IN}$ will be further described in relation to FIG. 3. In addition, the proportional coefficient between the voltage threshold VTH and the voltage $V_{IN}$ can be determined by the sense signal 158. Thus, the ON time is adjustable according to the load current flowing through the AC light source 132 so as to regulate the voltage $V_{REG}$. In this way, the load current of the LED strings can be regulated.

Figure 3:
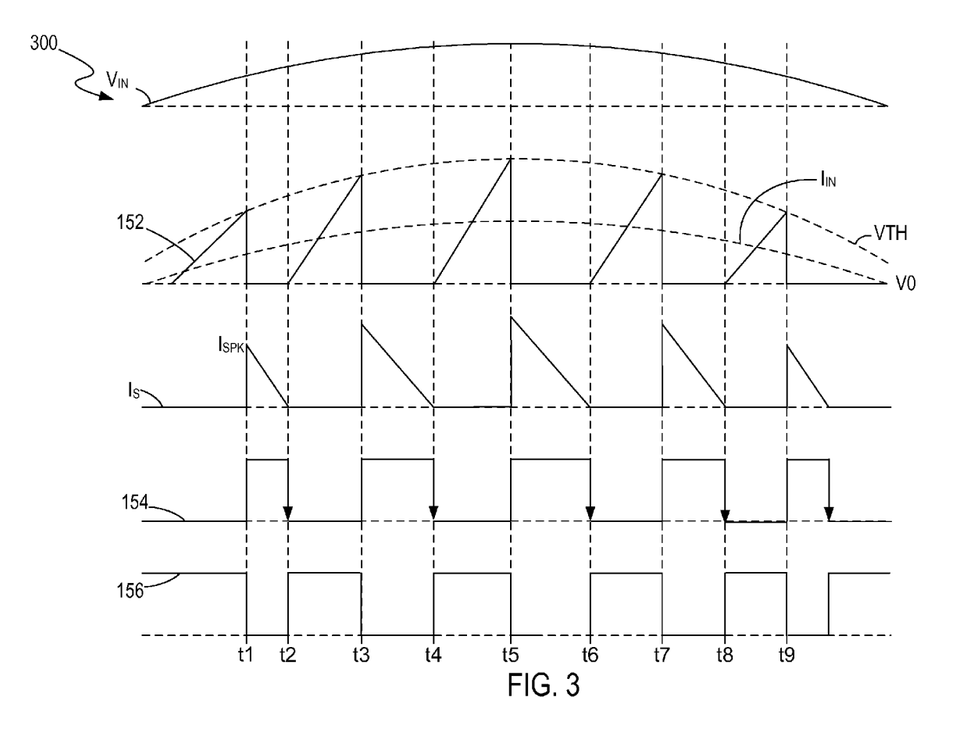
FIG. 3 illustrates a timing diagram of signals generated by a circuit for driving a load, in accordance with one embodiment of the present invention.

FIG. 3 illustrates a timing diagram 300 of signals generated by the circuit 200, in accordance with one embodiment of the present invention. FIG. 3 is described in combination with FIG. 1 and FIG. 2. FIG. 3 shows the input voltage $V_{IN}$, the voltage threshold VTH provided by the current regulator 246, the voltage of the current monitoring signal 152, the input current $I_{IN}$, the converter current $I_S$ through the secondary winding 217, the voltage of zero current detection signal 154, and the voltage of the control signal 156.

In one embodiment, the input voltage $V_{IN}$ has a rectified sinusoidal waveform since negative waves of the input AC voltage are excluded or converted to corresponding positive waves. The voltage threshold VTH is proportional to the input voltage $V_{IN}$, where the proportional coefficient can be determined by the sense signal 158.

The OFF time can be determined by the ZCD circuitry 242. At time t1, the voltage of the control signal 156 is changed to digital zero, which turns off the switch 220. Thus, the voltage of the current monitoring signal 152 drops to a predetermined level V0 such as zero volt, which indicates that the current $I_{CON}$ drops to a predetermined level I1 such as zero ampere. Accordingly, the current $I_S$ flowing through the secondary winding 217 rises to the level $I_{SPK}$ at time t1 and ramps down from t1 to t2 during which the energy is transferred from the core of the transformer T1 to the bridge circuit 112. At time t2, all the energy in the core of T1 is dissipated such that the current $I_S$ decreases to zero ampere. The auxiliary winding 218 senses both the current $I_S$ and $I_{CON}$, and generates the zero current detection signal 154 having a falling edge when $I_S$ decreases to zero ampere. As shown in the example of FIG. 3, when the voltage of the current monitoring signal 152 drops to a predetermined level V0 at time t1, the zero current detection signal 154 rises to a constant level. When the current $I_S$ drops to zero ampere, a falling edge of the zero current detection signal 154 is generated. Thus, the zero current detection signal 154 having a falling edge indicates that the current $I_{CON}$ has dropped to the predetermined level I1.

The ZCD circuitry 242 monitors the zero current detection signal 154, and generates the switch-trigger signal 264 based on a result of the monitoring. The drive circuitry 244 receives the switch-trigger signal 264. Therefore, the voltage of the control signal 156 can be set to digital one to turn on the switch 220 at time t2.

The ON time can be determined by the current regulator 246. At time t2, the voltage of the control signal 156 is digital one which turns on the switch 220. Therefore, the voltage of the current monitoring signal 152 can ramp up according to equation (1). The current regulator 246 compares the voltage of the current monitoring signal 152 to the voltage threshold VTH that is proportional to the input voltage $V_{IN}$, and generates the switch-termination signal 265 based on a result of the comparison. In one embodiment, the switch-termination signal 265 is generated when the voltage of the current monitoring signal 152 reaches the voltage threshold VTH at time t3. Therefore, the voltage of the control signal 156 is reset to zero at time t3, and the switch 220 is turned off accordingly. In other words, the voltage threshold VTH can indicate the peak level of the current $I_{CON}$. During the time intervals of t3 to t5, t5 to t7, and t7 to t9, the circuit 200 can operate in a similar way as during the time interval of t1 to t3.

Advantageously, peak levels of the voltage of the current monitoring signal 152, e.g., at time t1, t3, t5, t7 or t9, can be equal to the voltage threshold VTH that is proportional to the input voltage $V_{IN}$ at the power line 101. Additionally, the voltage of the current monitoring signal 152 can ramp up from the predetermined level V0 at time t2, t4, t6 or t8. The average level of the voltage of the current monitoring signal 152, e.g., indicating the current $I_{IN}$, is obtained by filtering high frequency components of the current monitoring signal 152. As shown in the example of FIG. 3, the current $I_{IN}$, which is equivalent to the average current of the current $I_{CON}$ ($I_{CON}$ is indicated by the current monitoring signal 152), follows the variation of the voltage $V_{IN}$. In another word, the current $I_{IN}$ is in phase with the voltage $V_{IN}$, which improves the power factor indicative of the power efficiency of the circuit 200.

Figure 4:
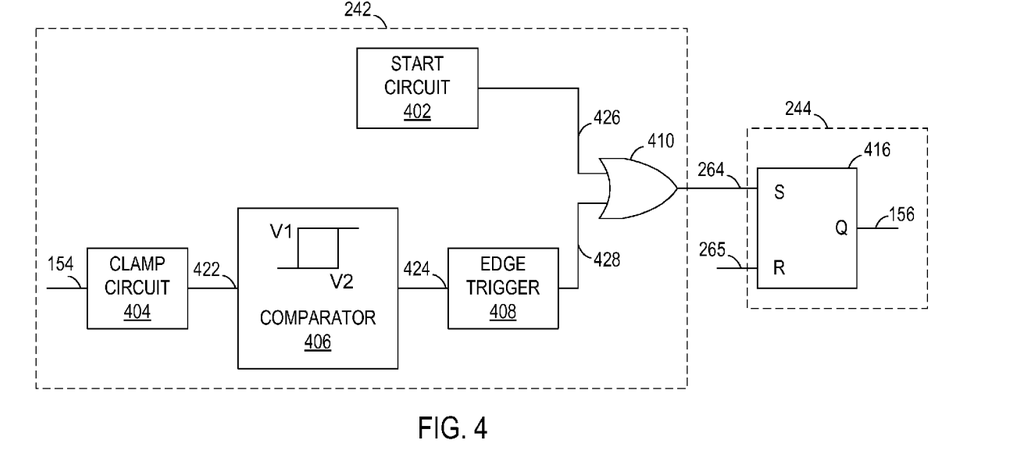
FIG. 4 illustrates a block diagram of a ZCD circuitry and drive circuitry, in accordance with one embodiment of the present invention.

FIG. 4 illustrates a block diagram of the ZCD circuitry 242 and the drive circuitry 244 of FIG. 2, in accordance with one embodiment of the present invention. FIG. 4 is described in combination with FIG. 1 and FIG. 2. Elements labeled the same as in FIG. 1 and FIG. 2 have similar functions.

In the example of FIG. 4, the drive circuitry 244 includes a flip-flop 416 for receiving the switch-trigger signal 264 and the switch-termination signal 265, and for generating the control signal 156 to control the switch 220 accordingly. The flip-flop 416 can be a reset-set (RS) flip-flop. As such, the output of the flip-flop 416 is set to digital one if the switch-trigger signal 264 is digital one and the switch-termination signal 265 is digital zero. Conversely, the output of the flip-flop 416 is reset to digital zero if the switch-trigger signal 264 is digital zero and the switch-termination signal 265 is digital one. The drive circuitry 244 can have other configurations and is not limited to the configuration in the example of FIG. 4.

The ZCD circuitry 242 can include a start circuit 402, a clamp circuit 404, a comparator 406, an edge trigger 408, and an OR gate 410. The ZCD circuitry 242 can have other configurations, and is not limited to the configuration in the example of FIG. 4. The start circuit 402 coupled to an input terminal of the OR gate 410 is operable for starting up the circuit 100 or 200. In one embodiment, the start circuit 402 outputs a digital one signal during a start-up period when the circuit 100 is initially powered on. Accordingly, the OR gate 410 outputs a digital one signal to set the flip-flop 416 so as to turn on the switch 220. After the start-up period, the start circuit 402 outputs a digital zero signal, such that the output of the OR gate 410 can be determined by the output of the edge trigger 408 during normal operation.

The clamp circuit 404 receives the zero current detection signal 154 and outputs a clamp signal 422. The clamp signal 422 follows the zero current detection signal 154, and a voltage variation of the clamp signal 422 is clamped within a predetermined range. For example, the voltage variation of the zero current detection signal 154 can be in the range of 0~100 volt, while the variation of the clamp signal 422 can be clamped within the range of 0~5 volt.

The comparator 406 can be a hysteresis comparator. The comparator 406 is operable for comparing the clamp signal 422 with predetermined voltage thresholds such as a low threshold V1 and a high threshold V2, and for generating a comparing signal 424 according to a result of the comparison. More specifically, the comparing signal 424 can be set to digital one if the clamp signal 422 is greater than the high threshold V2, and can be reset to digital zero if the clamp signal 422 is less than the low threshold V1. As discussed in relation to FIG. 2, the zero current detection signal 154 rises to a constant level when the switch 220 is turned off, and decreases after the current $I_{CON}$ has dropped to a predetermined level I1. Accordingly, a falling edge of the comparing signal 424 can be generated.

The edge trigger 408 is capable of detecting the comparing signal 424, and generating a trigger signal 428 to set the OR gate 410, e.g., if a falling edge of the comparing signal 424 is detected. Subsequently, the flip-flop 416 is set to turn on the switch 220. Advantageously, the switch 220 is turned on when the current $I_{CON}$ flowing through the primary winding 216 reaches the predetermined level I1, thereby enabling the current $I_{CON}$ to ramp up from I1.

Figure 5:
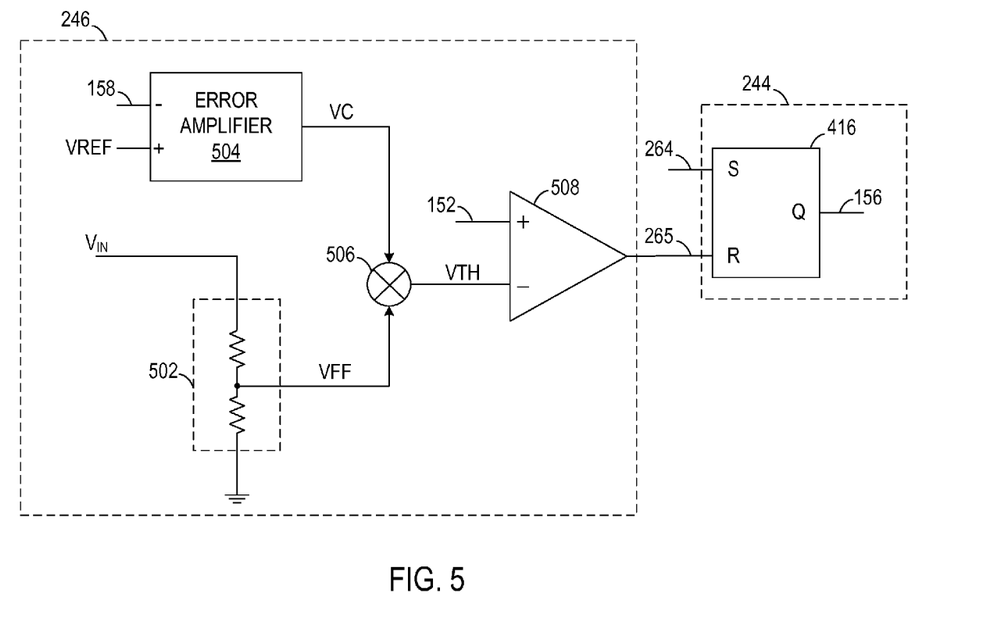
FIG. 5 illustrates a block diagram of a current regulator and drive circuitry, in accordance with one embodiment of the present invention.

FIG. 5 illustrates a block diagram of the current regulator 246 and the drive circuitry 244 of FIG. 2, in accordance with one embodiment of the present invention. FIG. 5 is described in combination with FIG. 1 and FIG. 2. Elements labeled the same as in FIG. 1, FIG. 2 and FIG. 4 have similar functions.

In the example of FIG. 5, the current regulator 246 includes a voltage divider 502, an error amplifier 504, a multiplier 506, and a comparator 508. The voltage divider 502 coupled to ground is operable for receiving the input voltage $V_{IN}$ and for generating a reference voltage VFF proportional to the input voltage $V_{IN}$, which can be given by:

$$VFF = k*V_{IN}, \quad (4)$$

where k is a constant indicating a proportional coefficient between VFF and $V_{IN}$.

The error amplifier 504 has an inverting input terminal for receiving the sense signal 158 and a non-inverting input terminal for receiving a predetermined reference voltage VREF. In one embodiment, VREF can be a predetermined constant voltage and can be set to an amount that is equal to the voltage of the sense signal 158, e.g., when the circuit 200 is powered on. The error amplifier 504 compares the sense signal 158 to the reference voltage VREF, and outputs an amplified signal whose voltage VC is a function of the load current through the AC light source 132 according to a result of the comparison. For example, if the reference voltage VREF is equal to the sense signal 158, the error amplifier 504 can output a voltage V4. If there is a difference $\Delta V$ between the reference voltage VREF and the sense signal 158, e.g., caused by the variation of the current I_LED1, the error amplifier 504 can amplify the difference $\Delta V$. The voltage VC can be set to an amount that is equal to the voltage level V4 plus the amplified difference, which can be given by:

$$VC = A*\Delta V + V4 = A*(VREF - R\_238*I_{LED2}) + V4, \quad (5)$$

where A represents an amplification coefficient of the error amplifier 504, and R_238 represents the resistance of the resistor 238. As shown in equation (5), VC is a function of the load current $I_{LED2}$.

In one embodiment, the multiplier 506 is capable of receiving the voltage VC from the error amplifier 504 and receiving the reference voltage VFF from the voltage divider 502. The multiplier 506 can further provide a voltage threshold VTH that is equal to a product of the voltage VC and the reference voltage VFF. Combining the equations (4) and (5), the voltage threshold VTH can be given according to:

$$VTH = VC*VFF = (A*\Delta V + V4)*(k*V_{IN}). \quad (6)$$

As shown in equation (6), the voltage threshold VTH is proportional to the input voltage $V_{IN}$. In addition, the proportional coefficient between the voltage threshold VTH and the input voltage V_IN, e.g., k*(A*$\Delta V$+V4), is also a function of the load current through the AC light source 132. That is, the proportional coefficient is determined by the sense signal 158.

The comparator 508 is capable of comparing the current monitoring signal 152 indicative of the current $I_{CON}$ to the voltage threshold VTH, and generating a digital one signal to reset the flip-flop 416 if the current monitoring signal 152 is greater than the voltage threshold VTH. Advantageously, peak levels of the current monitoring signal 152 are equal to the voltage threshold VTH that is proportional to the level of the input voltage $V_{IN}$. Thus, the power factor is improved as discussed in relation to FIG. 3.

Advantageously, the proportional coefficient between the voltage threshold VTH and the voltage $V_{IN}$ can be determined by the sense signal 158 indicative of the current $I_{LED2}$ flowing through the LED string 132_2, as shown in the equation (6). Therefore, the current of the LED strings 132_1 and 132_2 can be regulated. For example, if the current $I_{LED2}$ is increased, e.g., caused by the variation of the regulated voltage $V_{REG}$, the sense signal 158 is increased accordingly. According to equation (6), the proportional coefficient is decreased, which may decrease the voltage threshold VTH. As such, the current monitoring signal 152 may spend less time to reach the voltage threshold VTH, thereby decreasing the ON time. Consequently, the regulated voltage $V_{REG}$ is decreased, which results in a decrease of the current flowing through the LED strings 132_1 and 132_2. Similarly, if the current $I_{LED2}$ is decreased, the current regulator 246 can operate to increase the ON time to increase the current flowing through the LED strings 132_1 and 132_2. In this way, the current of the LED strings can be regulated to remain within a desirable range, thereby increasing the stability of the LED strings.

Advantageously, the brightness of the LED strings 132_1 and 132_2 can be adjusted by users. For example, to increase the brightness of the LED strings 132_1 and 132_2, the resistance of the sensor 238 can be decreased by users, which results in a voltage decrease of the sense signal 158. As shown in equation (6), the current regulator 246 can automatically increase the voltage VC, thus increasing the voltage threshold VTH. As such, the ON time can be increased to increase regulated voltage $V_{REG}$. Therefore, the load current flowing through the LED strings 132_1 and 132_2 can be increased to increase the brightness of the LED strings 132_1 and 132_2.

The configuration and method for correcting the power factor of the circuit and for regulating the load current in the present invention can also be employed in a system including other types of loads. For example, by replacing the bridge circuit 112 and the AC light source 132 to a DC light source such as multiple DC LED strings, the regulated voltage $V_{REG}$ can also be used to drive the DC LED strings. In this instance, the controller 108 can correct a power factor of the system by controlling a current path of the current $I_{CON}$ flowing through the primary winding 216. Also, by sensing a load current flowing through the DC LED strings, the controller 108 can adjust the regulated voltage $V_{REG}$ to regulate the load current.

Figure 6:
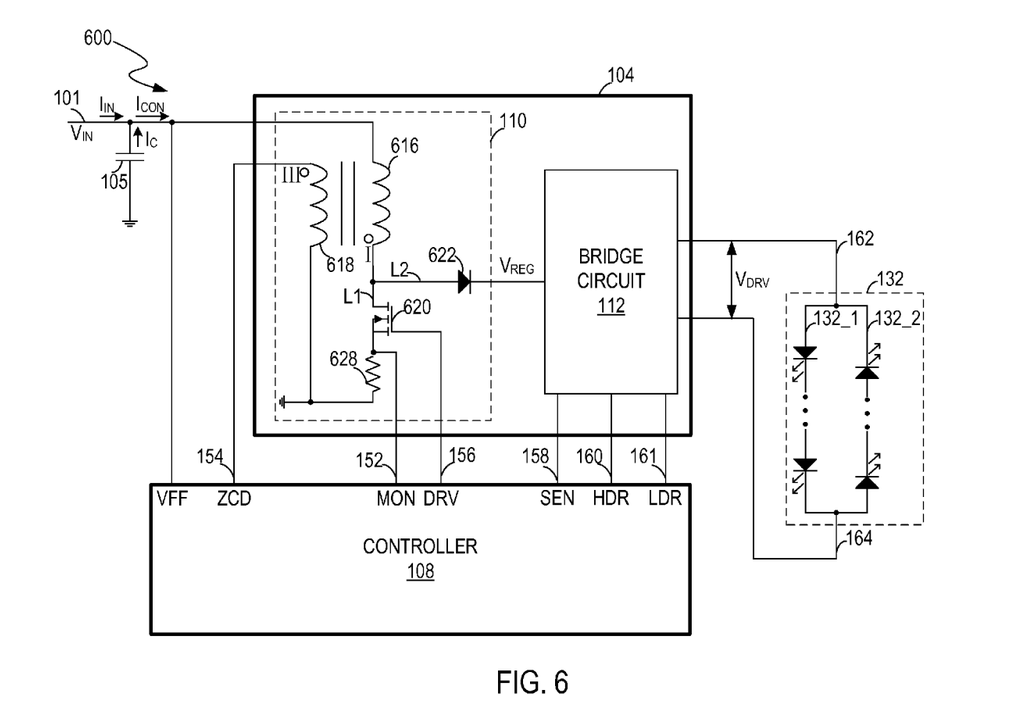
FIG. 6 illustrates another block diagram of a circuit for driving a load, in accordance with one embodiment of the present invention.

FIG. 6 illustrates another block diagram of a circuit 600 for driving a load, in accordance with one embodiment of the present invention. Elements labeled the same as in FIG. 1 and FIG. 2 have similar functions. FIG. 6 is described in combination with FIG. 1, FIG. 2, and FIG. 3. In the example of FIG. 6, the converter 110 includes a transformer T2, a switch 620, a current sensor 628, and a diode 622. The transformer T2 includes a primary winding 616 and an auxiliary winding 618. In this instance, the primary winding 616, the switch 620, the diode 622, and the capacitors C1 and C2 of the bridge circuit 112 constitute a boost converter for converting the input voltage $V_{IN}$ to the regulated voltage $V_{REG}$.

In one embodiment, the current $I_{CON}$ flowing through the primary winding 616 has two current paths such as L1 and L2. The switch 620 enables and disables the current path L1 according to the control signal 156. During the ON time when the switch 620 is turned on to enable the current path L1, the diode 622 is reverse-biased and the current $I_{CON}$ of the primary winding 616 can flow through the current path L1. Since the voltage difference across the primary winding 616 is positive, e.g., the input voltage $V_{IN}$ is greater than the ground potential, the current $I_{CON}$ ramps up to store energy in the primary winding 616. Meanwhile, the current sensor 628 provides a current monitoring signal 152 indicative of the current $I_{CON}$, which is used by the current regulator 246 to determine the ON time of the switch 620.

During an OFF time when the current path L1 is disabled, the diode 622 becomes forward-biased and the current $I_{CON}$ of the primary winding 616 can flow through the current path L2. Since the voltage difference across the primary winding 616 becomes negative, the current $I_{CON}$ ramps down to transfer the energy in the primary winding 616 to the bridge circuit 112. A waveform of the current $I_{CON}$ during the OFF time is similar to the waveform of the current $I_S$ during the corresponding OFF time as shown in relation to FIG. 3. The current $I_{CON}$ decreases to the predetermined level I1 when the energy stored in the primary winding 616 is dissipated.

Similar to the auxiliary winding 218 in relation to FIG. 2, the auxiliary winding 618 magnetically coupled to the primary winding 616 can detect variation of the current $I_{CON}$ through the primary winding 616. More specifically, when the switch 620 is turned off, the current $I_{CON}$ starts to ramp down. Thus, the voltage of the zero current detection signal 154 rises to a positive level. When the current $I_{CON}$ decreases to I1, a falling edge of the zero current detection signal 154 is generated to indicate that the current $I_{CON}$ has dropped to the predetermined level I1.

Advantageously, by using the boost converter disclosed in the example of FIG. 6, the controller 108 can also generates the control signal 156 to control the switch 620 based on the zero current detection signal 154 and the input voltage $V_{IN}$. Thus, the current $I_{CON}$ ramps up from the predetermined level I1 each time when the current path L1 is enabled. Moreover, the peak level of the current $I_{CON}$ is proportional to the input voltage $V_{IN}$. As such, the waveform of the input current $I_{IN}$, e.g., indicating the average current of the current $I_{CON}$, follows the waveform of the input voltage $V_{IN}$. That is, the power factor of the circuit 600 is corrected and the power efficiency of the circuit 600 is improved.

Figure 7:
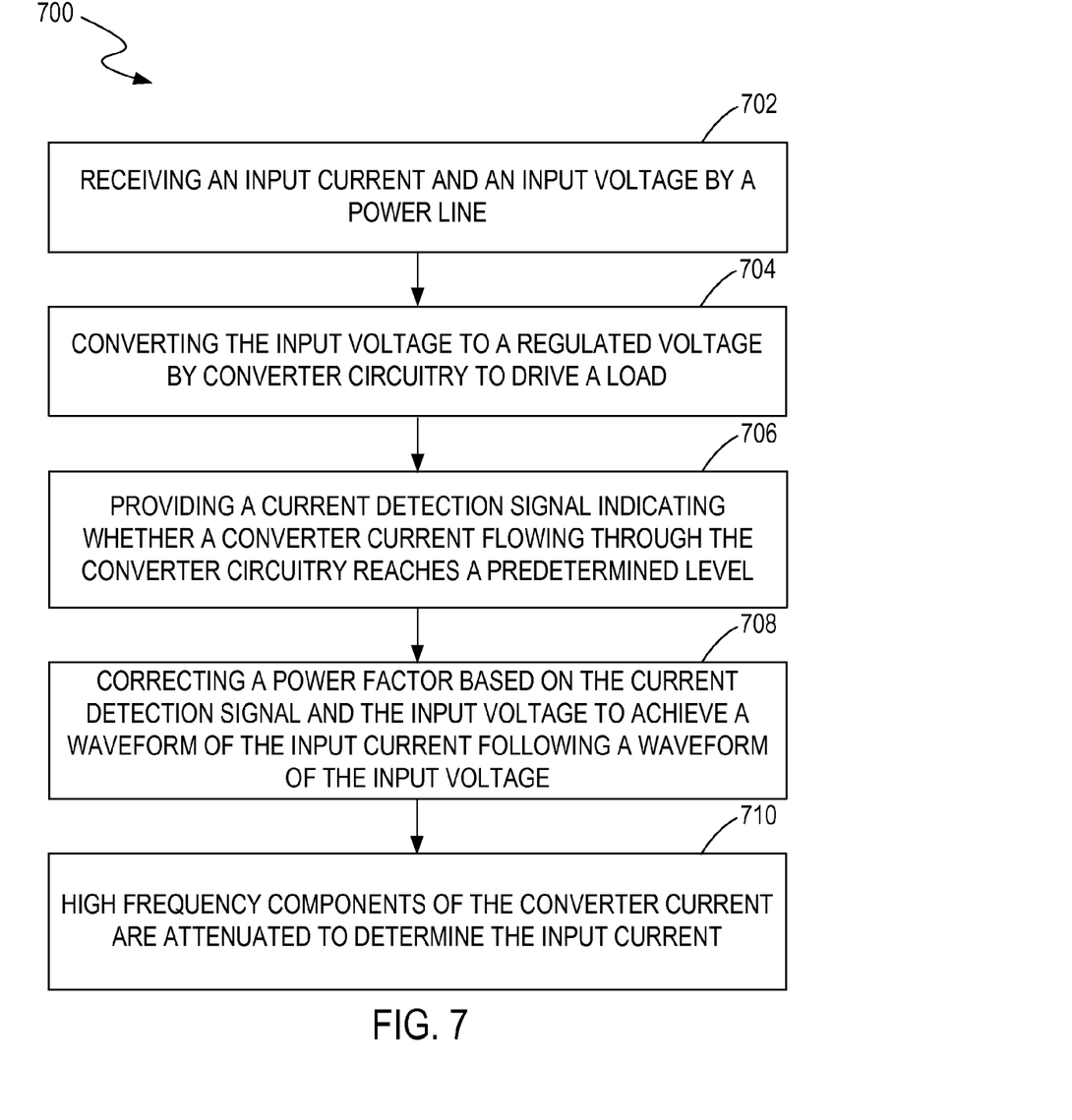
FIG. 7 illustrates a flowchart of operations performed by a circuit for driving a load, in accordance with one embodiment of the present invention.

FIG. 7 illustrates a flowchart 700 of operations performed by a circuit for driving a load, e.g., the circuit 100, 200 or 600, in accordance with one embodiment of the present invention. FIG. 7 is described in combination with FIG. 1-FIG. 6. Although specific steps are disclosed in FIG. 7, such steps are examples. That is, the present invention is well suited to performing various other steps or variations of the steps recited in FIG. 7.

In block 702, an input current, e.g., the input current $I_{IN}$, and an input voltage, e.g., the input voltage $V_{IN}$, are provided by a power line, e.g., the power line 101. In one embodiment, an input AC voltage is commutated to provide the input voltage. In block 704, the input voltage is converted to a regulated voltage, e.g., the regulated voltage $V_{REG}$, by converter circuitry, e.g., the converter circuitry 104, to drive a load, e.g., the AC light source 132. In one embodiment, the regulated voltage is transformed to a regulated AC voltage to drive the load. More specifically, in one embodiment, the regulated voltage is divided to a divided voltage at a first terminal of the load. Furthermore, the regulated voltage and a constant voltage are alternately applied to a second terminal of the load. Thus, the regulated AC voltage is obtained between the first and second terminals.

In block 706, a current detection signal, e.g., the zero current detection signal 154, indicating whether a converter current, e.g., the converter current $I_{CON}$, flowing through the converter circuitry drops to a predetermined level, e.g., I1. In block 708, a power factor is corrected based on the current detection signal and the input voltage such that a waveform of the input current follows a waveform of the input voltage. In one embodiment, a current path of the converter current is enabled according to the current detection signal. The converter current ramps up from the predetermined level when the current path is enabled. Additionally, a threshold proportional to the input voltage is generated. A current monitoring signal indicating the converter current is compared with the threshold. The current path of the converter current is disabled according to a result of the comparison. As such, the threshold indicates a peak level of the converter current. In one embodiment, a proportional coefficient between the input voltage and the threshold is determined according to a load current flowing through the load. In block 710, high frequency components of the converter current are attenuated to determine the input current. The input current indicates an average current of the converter current.

While the foregoing description and drawings represent embodiments of the present invention, it will be understood that various additions, modifications and substitutions may be made therein without departing from the spirit and scope of the principles of the present invention. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, and not limited to the foregoing description.

What is claimed is:

1. A circuit for driving a light emitting diode (LED) light source, said circuit comprising:
   a power line for providing an input current and an input voltage;
   converter circuitry coupled to said power line and operable for converting said input voltage to a regulated voltage to drive said LED light source, and for providing a current detection signal indicating whether a converter current flowing through said converter circuitry drops to a predetermined level; and
   a controller coupled to said converter circuitry and operable for correcting a power factor of said circuit based on said current detection signal and said input voltage such that a waveform of said input current follows a waveform of said input voltage.

2. The circuit as claimed in claim 1, wherein said LED light source comprises a pair of light emitting diode (LED) strings wired in opposite polarity connections and coupled in parallel.

3. The circuit as claimed in claim 1, wherein said converter circuitry comprises a bridge circuit operable for transforming said regulated voltage to a regulated alternating current (AC) voltage to drive said LED light source.

4. The circuit as claimed in claim 3, wherein said bridge circuit comprises:
   a voltage divider coupled to a first terminal of said LED light source, and operable for dividing said regulated voltage to a divided voltage at said first terminal; and
   a switching circuit coupled to a second terminal of said LED light source, and operable for alternately applying said regulated voltage and a constant voltage to said second terminal,
   wherein said regulated AC voltage is obtained between said first and second terminals.

5. The circuit as claimed in claim 1, wherein said controller further comprises:
   current detection circuitry operable for generating a switch-trigger signal to enable a current path of said converter current according to said current detection signal, wherein said converter current ramps up from said predetermined level when said current path is enabled.

6. The circuit as claimed in claim 1, wherein said controller further comprises:
   a current regulator operable for providing a threshold proportional to said input voltage, for comparing a current monitoring signal indicating said converter current with said threshold, and for generating a switch-termination signal to disable a current path of said converter current according to a result of said comparison, wherein said threshold indicates a peak level of said converter current.

7. The circuit as claimed in claim 6, wherein a proportional coefficient between said input voltage and said threshold is determined by a load current flowing through said LED light source.

8. The circuit as claimed in claim 1, further comprising:
   a filter coupled to said converter circuitry and operable for attenuating high frequency components of said converter current to determine said input current, wherein said input current indicates an average current of said converter current.

9. The circuit as claimed in claim 1, further comprising:
   a sensor coupled to said LED light source and operable for providing a sense signal indicative of a load current flowing through said LED light source, wherein said controller adjusts said regulated voltage according to said sense signal to regulate said load current.

10. An electronic system comprising:
    a pair of light emitting diode (LED) strings wired in opposite polarity connections and coupled in parallel;
    a converter comprising a primary winding and an auxiliary winding, wherein said converter is operable for receiving an input voltage at said primary winding, for converting said input voltage to a regulated voltage, and for providing a current detection signal at said auxiliary winding, said current detection signal indicating whether a converter current through said primary winding drops to a predetermined level;
    a bridge circuit coupled to said converter and operable for transforming said regulated voltage to a regulated alternating current (AC) voltage to drive said LED strings; and
    a controller coupled to said converter and operable for correcting a power factor of said electronic system based on said current detection signal and said input voltage such that a waveform of an average current of said converter current follows a waveform of said input voltage.

11. The electronic system as claimed in claim 10, wherein said controller further comprises:

current detection circuitry operable for generating a switch-trigger signal to enable a current path of said converter current based on said current detection signal; and a current regulator coupled to said current detection circuitry and operable for comparing a current monitoring signal indicating said converter current to a threshold proportional to said input voltage and for generating a switch-termination signal to disable said current path based on a result of said comparison.

12. The electronic system as claimed in claim 11, wherein said converter current ramps up from said predetermined level when said current path is enabled, and wherein a peak level of said converter current is proportional to said input voltage.

13. The electronic system as claimed in claim 11, wherein said current regulator determines a proportional coefficient between said input voltage and said threshold according to a load current flowing through said LED strings.

14. The electronic system as claimed in claim 10, wherein said bridge circuit further comprises:

a voltage divider coupled to a first terminal of said LED strings, and operable for dividing said regulated voltage to a divided voltage at said first terminal; and a switching circuit coupled to a second terminal of said LED strings, and operable for alternately applying said regulated voltage and a constant voltage to said second terminal, wherein said regulated AC voltage is obtained between said first and second terminals.

15. The electronic system as claimed in claim 10, further comprising:

A filter coupled to said converter and operable for obtaining said average current by removing high frequency components of said converter current.

* * * * *